(12) United States Patent
Boyer et al.

(10) Patent No.: US 8,105,651 B2
(45) Date of Patent: Jan. 31, 2012

(54) ARTIFACTS, METHODS OF CREATING SUCH ARTIFACTS AND METHODS OF USING SUCH ARTIFACTS

(75) Inventors: Jesse R. Boyer, Berlin, CT (US); Jeffry K. Pearson, Newport Beach, CA (US); Randall W. Joyner, Union, CT (US)

(73) Assignee: United Technologies Corp., Hartford, CT (US)

( * ) Notice: Subject to any disclaimer, the term of this patent is extended or adjusted under 35 U.S.C. 154(b) by 773 days.

(21) Appl. No.: 11/962,382

(22) Filed: Dec. 21, 2007

(65) Prior Publication Data

US 2009/0163390 A1   Jun. 25, 2009

(51) Int. Cl.
*B05D 3/00* (2006.01)
(52) U.S. Cl. ........................................ 427/299
(58) Field of Classification Search ............... 427/299, 427/421.1
See application file for complete search history.

(56) References Cited

U.S. PATENT DOCUMENTS

| | | | |
|---|---|---|---|
| 4,770,896 A * | 9/1988 | Crown et al. | 427/461 |
| 4,985,306 A * | 1/1991 | Morizane et al. | 216/53 |
| 5,540,505 A | 7/1996 | Struziak | |
| 5,748,505 A | 5/1998 | Greer | |
| 5,958,847 A | 9/1999 | Novak | |
| 6,078,846 A | 6/2000 | Greer et al. | |
| 6,090,756 A * | 7/2000 | Brown | 508/118 |
| 6,165,542 A | 12/2000 | Jaworowski et al. | |
| 6,175,415 B1 | 1/2001 | Pietrzak et al. | |
| 6,205,240 B1 | 3/2001 | Pietrzak et al. | |
| 6,285,959 B1 | 9/2001 | Greer | |
| 6,704,102 B2 | 3/2004 | Roelke | |
| 6,822,748 B2 | 11/2004 | Johnston et al. | |
| 6,944,564 B2 * | 9/2005 | De Jonge et al. | 702/104 |
| 6,977,356 B2 | 12/2005 | Vaidyanathan et al. | |
| 7,036,236 B1 | 5/2006 | Drescher et al. | |
| 7,113,878 B1 | 9/2006 | Loferer et al. | |
| 7,180,607 B2 | 2/2007 | Kyle et al. | |
| 2003/0071194 A1 * | 4/2003 | Mueller et al. | 250/208.1 |
| 2003/0224947 A1 * | 12/2003 | Naik et al. | 508/121 |
| 2004/0027347 A1 * | 2/2004 | Farsaie | 345/419 |
| 2005/0244574 A1 * | 11/2005 | LeClaire | 427/180 |

OTHER PUBLICATIONS

"Optical 3-D Measuring Systems—Optical Systems Based on Area Scanning, VDI/VDE 2634 Part 2", Aug. 2002.*

* cited by examiner

*Primary Examiner* — Timothy Meeks
*Assistant Examiner* — Nathan T Leong

(57) ABSTRACT

Artifacts, methods of creating such artifacts and methods of using such artifacts are provided. In this regard, an exemplary embodiment of a method for creating an artifact for quantifying measurement accuracy of non-contact sensors included in optical three-dimensional (3-D) measuring systems, comprises: fabricating an artifact using a base material; and coating the artifact with an approximately uniform coating of dry film lubricant.

18 Claims, 2 Drawing Sheets

ARTIFACTS, METHODS OF CREATING SUCH ARTIFACTS AND METHODS OF USING SUCH ARTIFACTS

BACKGROUND

1. Technical Field

The present invention relates generally to non-contact sensors.

2. Description of the Related Art

Various methods exist for creating artifacts for quantifying the measurement accuracy of non-contact sensors included in optical 3-D imaging systems. For example, one prior art method includes fabricating an artifact, and then manually coating the artifact with a white powder coating of tempera paint. Unfortunately, such coatings tend to be non-uniform and can cause measurement errors that prevent parameters of interest from being properly measured by optical 3-D imaging systems.

SUMMARY

Artifacts, methods of creating such artifacts and methods of using such artifacts are provided. In this regard, an exemplary embodiment of a method for creating an artifact for quantifying measurement accuracy of non-contact sensors included in optical three-dimensional (3-D) measuring systems, comprises: fabricating an artifact using a base material; and coating the artifact with an approximately uniform coating of dry film lubricant.

An exemplary embodiment of a method for quantifying measurement accuracy of non-contact sensors comprises: fabricating an artifact using a base material; coating the artifact with an approximately uniform coating of dry film lubricant such that reflective noise generated when the artifact is scanned by an optical three-dimensional measuring system is reduced; and scanning the artifact using an optical three-dimensional measuring system.

An exemplary embodiment of an artifact for quantifying measurement accuracy of non-contact sensors in optical 3-D measuring systems, comprises: an artifact body; and an approximately uniform coating of dry film lubricant bonded to the artifact body.

Other methods, features and/or advantages of this disclosure will be or may become apparent to one with skill in the art upon examination of the following drawings and detailed description. It is intended that all such additional methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Artifacts, methods of creating such artifacts and methods of using such artifacts are provided, several exemplary embodiments of which will be described in detail. In this regard, non-contact sensors include cameras and other types of imaging devices, whereas optical 3-D imaging systems include fringe projection, laser systems, and other systems, such as the Advanced Topometric System or ATOS.

In some embodiments, solid (or dry) film lubricants are used. By way of example, an exemplary embodiment involves fabricating an artifact out of a base material and then coating the artifact with an approximately uniform coating of dry film lubricant. Dry film lubricants tend to be inexpensive, readily available, and do not significantly effect the dimensions of the artifact. The coating of dry film lubricant allows the artifact to be easily scanned by optical 3-D imaging systems and potentially eliminates measurement errors created by non-uniform coatings. The dry film lubricant coating also tends to reduce reflective noise generated when the artifact is scanned by these imaging systems.

Figure 1:
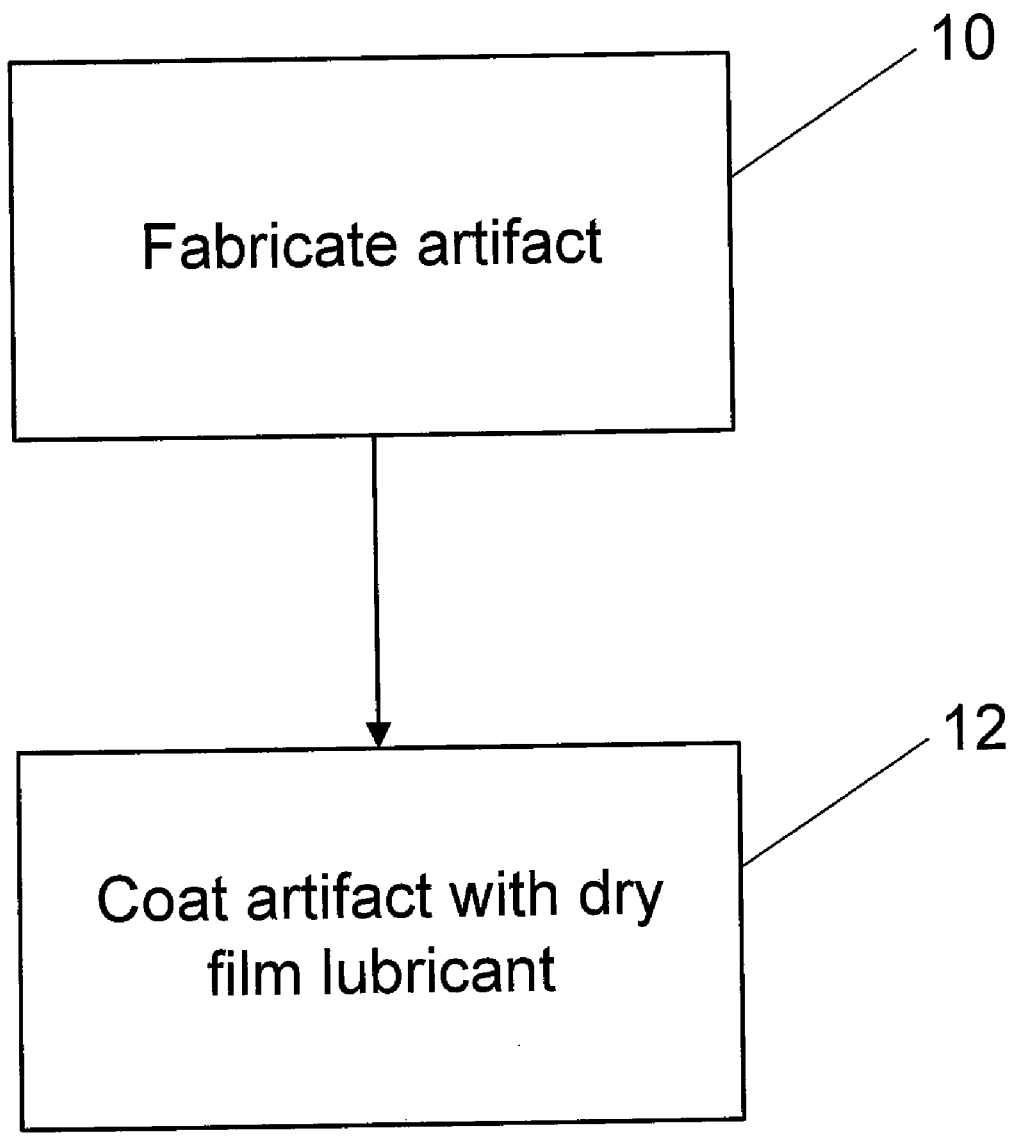
FIG. 1 is a flow chart showing the steps included in an exemplary embodiment of a method of creating an artifact for use in quantifying the measurement accuracy of a non-contact sensor included in an optical 3-D imaging system.

In this regard, reference is made to FIG. 1, which is a flow chart showing the steps included in an exemplary embodiment of a method of creating an artifact for use in quantifying the measurement accuracy of a non-contact sensor included in an optical 3-D imaging system. As shown in FIG. 1, the method includes the steps of fabricating an artifact out of a base material (block 10) and then coating the artifact with an approximately uniform coating of solid (or dry) film lubricant (block 12). Notably, a variety of different base materials may be used, including steel, nickel, titanium, and any other material having properties similar to these materials or suitable for a given application. Similarly, a variety of different dry film lubricants may be used, including thermally cured, molybdenum disulphide (MoS2), graphite, MoS2/graphite, polytetrafluoroethylene (PTFE), and/or PTFE/MoS2 based dry film lubricants, such as Alseal® 315, Everslik® 122, Everslik® 2401, Lube-Lok® 5306, and Teflon®.

Such a method can be used to create a variety of different types of artifacts, including dumbbell artifacts and rectangular parallelepiped artifacts that comply with VDI/VDE standard 2634—Part 2. This standard is well known in the art and is described in a document entitled "Optical 3-D Measuring Systems, Optical Systems Based on Area Scanning, VDI/VDE 2634, Part 2", which is incorporated by referenced into this application. As explained in detail in the VDI/VDE 2634 standard, the dimensions of these artifacts vary depending on the volume to be measured in a given application.

Figure 2:
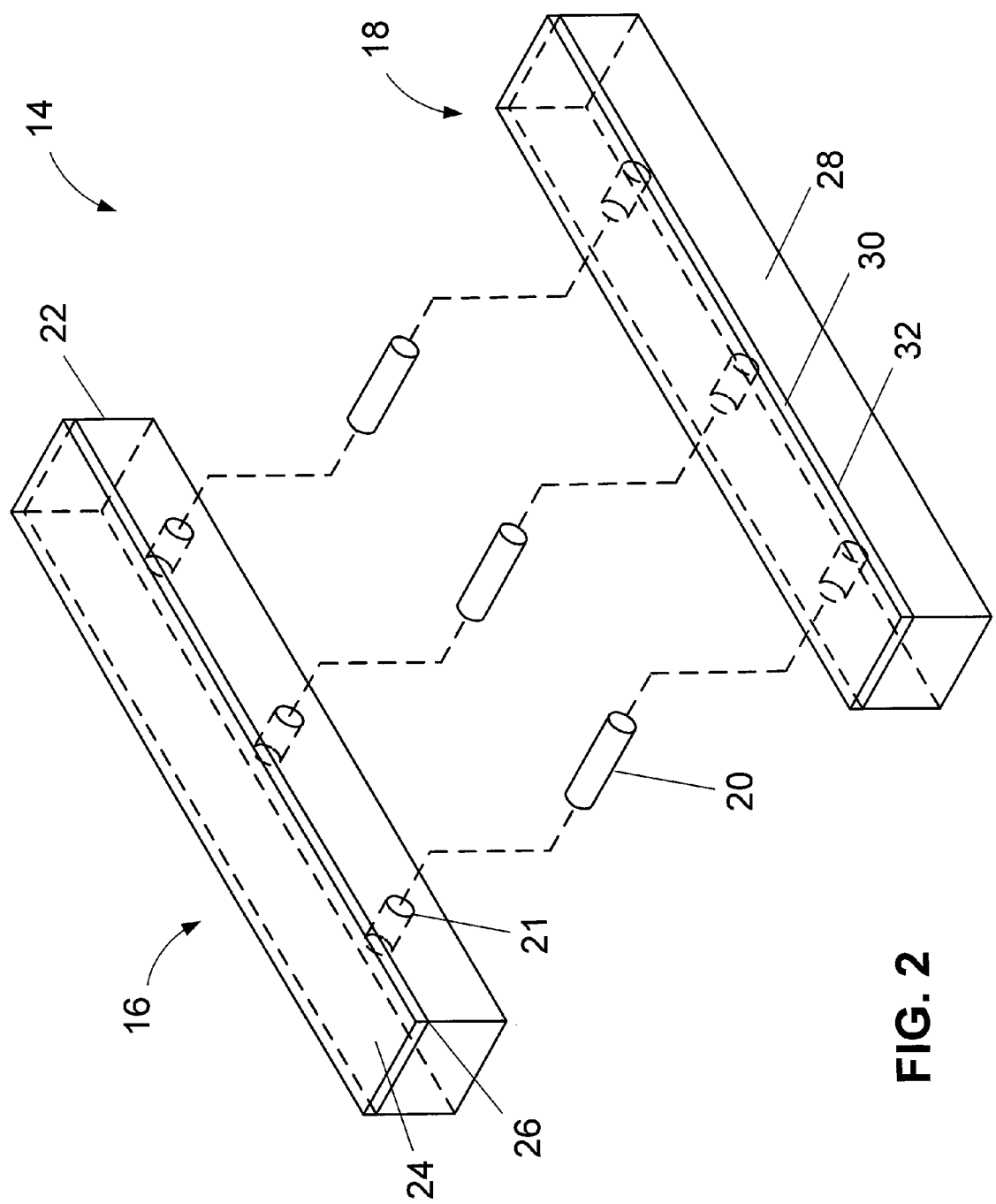
FIG. 2 is a perspective view showing an exemplary embodiment of an artifact.

An exemplary embodiment of a rectangular parallelepiped artifact 14 created using a method, such as that described above with respect to FIG. 1, is shown schematically in FIG. 2. As shown in FIG. 2, artifact 14 includes a first artifact part 16 connected to a second artifact part 18 using a series of pins (e.g., pin 20) and corresponding openings (e.g., opening 21). First artifact part 16 includes an artifact part body 22 and an approximately uniform coating 24 of dry film lubricant bonded to an inspection surface 26 located on top of artifact part body 22. Second artifact body 18 is identical to first artifact body 16 and includes an artifact part body 28 and an approximately uniform coating 30 of dry film lubricant bonded to an inspection surface 32 located on top of artifact part body 28. Although the embodiment shown in FIG. 2 includes two identical parts, in other embodiments, other numbers and configurations of parts can be used.

Inspection surfaces 26 and 32 are non-specular and designed to be scanned by fringe projection, laser, and/or other similar types of non-contact sensors, such as those known in the art. The thickness of coatings 24 and 30 are approximately uniform and, in one embodiment, do not vary by more than approximately 0.0003 inches.

In other embodiments, the variation in the uniformity of the coating may be more or less depending upon the requirements of a given application. Coatings 24 and 30 reduce reflective noise created when artifact 14 is scanned by a non-contact sensor. The reduction in reflected noise is attributable to the opaque nature of the coatings, which in one exemplary embodiment, are gray in color and have a matte finish.

To ensure that coatings 24 and 30 are approximately uniform, inspection surfaces 26 and 32 can be lapped and grit blasted so they are approximately uniform, artifact 14 can be heated to a predetermined temperature, the coatings can be applied using a mechanical arm to ensure that a uniform coating of dry film lubricant is applied to the surfaces, and artifact 14 can be baked at a predetermined temperature for a predetermined time period.

By way of example, inspection surfaces 26 and 32 can be lapped to approximately 0.000030 of an inch and grit blasted with 400 grit aluminum oxide. Artifact 14 (or bar 14) can be heated to approximately 180 degrees Fahrenheit and dry film lubricant sprayed on inspection surfaces 26 and 32 using a mechanical arm to form coatings 24 and 30. The use of a mechanical arm ensures approximately uniform coverage of dry film lubricant on inspection surfaces 26 and 32. Artifact 14 can then be baked in an oven at approximately 250-400 degrees Fahrenheit for approximately 2 to 4 hours.

The above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A method of creating an artifact for use with an optical three-dimensional (3-D) measuring system, comprising:
   fabricating an artifact that includes an inspection surface using a base material, which artifact is configured to quantify measurement accuracy of a non-contact sensor included in the optical three-dimensional measuring system, which artifact comprises one of a dumbbell artifact and a rectangular parallel piped artifact, and which inspection surface comprises a surface of one of the dumbbell artifact and the rectangular parallel piped artifact;
   heating the artifact to a predetermined temperature; and
   coating the inspection surface of the heated artifact with an approximately uniform coating of dry film lubricant;
   wherein the dry film lubricant provides the coating with an opaque matte gray finish.

2. The method of claim 1, wherein the base material comprises at least one of steel, nickel, and titanium.

3. The method of claim 1, wherein the dry film lubricant is a thermally cured dry film lubricant.

4. The method of claim 1, wherein the dry film lubricant comprises at least one of molybdenum disulphide (MoS2), graphite, MoS2/graphite, polytetrafluoroethylene (PTFE), and PTFE/MoS2 based dry film lubricant.

5. The method of claim 1, wherein the artifact complies with VDI/VDE standard 2634—Part 2.

6. The method of claim 1, further comprising:
   lapping the artifact;
   grit blasting the artifact with an abrasive blasting media;
   spraying the heated artifact with a dry film lubricant to coat the heated artifact with the approximately uniform coating of dry film lubricant; and
   baking the artifact and dry film lubricant at a predetermined temperature for a predetermined time period.

7. The method of claim 6, wherein the artifact is lapped to approximately 0.00003 of an inch and grit blasted with 400 grit aluminum.

8. The method of claim 6, wherein the artifact is heated to approximately 180 degrees Fahrenheit and sprayed with the dry film lubricant.

9. The method of claim 6, wherein the artifact and dry film lubricant are baked at approximately 250-400 degrees Fahrenheit for approximately 2-4 hours.

10. A method of creating an artifact for use with an optical three-dimensional (3-D) measuring system, comprising:
    fabricating an artifact that includes an inspection surface using a base material, which artifact is configured to quantify measurement accuracy of a non-contact sensor included in the optical three-dimensional measuring system, which artifact comprises one of a dumbbell artifact and a rectangular parallel piped artifact, and which inspection surface comprises a surface of one of the dumbbell artifact and the rectangular parallel piped artifact;
    heating the artifact to a predetermined temperature; and
    coating the inspection surface of the heated artifact with an approximately uniform coating consisting essentially of dry film lubricant.

11. The method of claim 10, wherein the base material comprises at least one of steel, nickel, and titanium.

12. The method of claim 10, wherein the dry film lubricant is a thermally cured dry film lubricant.

13. The method of claim 10, wherein the dry film lubricant comprises at least one of molybdenum disulphide (MoS2), graphite, MoS2/graphite, polytetrafluoroethylene (PTFE), and PTFE/MoS2 based dry film lubricant.

14. The method of claim 10, wherein the artifact complies with VDI/VDE standard 2634—Part 2.

15. The method of claim 10, further comprising:
    lapping the artifact;
    grit blasting the artifact with an abrasive blasting media;
    spraying the heated artifact with a dry film lubricant to coat the heated artifact with the approximately uniform coating of dry film lubricant; and
    baking the artifact and dry film lubricant at a predetermined temperature for a predetermined time period.

16. The method of claim 15, wherein the artifact is lapped to approximately 0.00003 of an inch and grit blasted with 400 grit aluminum.

17. The method of claim 15, wherein the artifact is heated to approximately 180 degrees Fahrenheit and sprayed with the dry film lubricant.

18. The method of claim 15, wherein the artifact and dry film lubricant are baked at approximately 250-400 degrees Fahrenheit for approximately 2-4 hours.

* * * * *